United States Patent
Feiner et al.

(10) Patent No.: US 9,786,246 B2
(45) Date of Patent: Oct. 10, 2017

(54) APPARATUS FOR HANDS-FREE AUGMENTED REALITY VIEWING

(71) Applicant: AR TABLES, LLC, Wilmington, DE (US)

(72) Inventors: Adam M. Feiner, Phoenixville, PA (US); Zachary John Kennedy, Phoenixville, PA (US); Mikel Kevin Lord, Jr., Exton, PA (US)

(73) Assignee: AR Tables, LLC, Wilmington, DE (US)

( * ) Notice: Subject to any disclaimer, the term of this patent is extended or adjusted under 35 U.S.C. 154(b) by 729 days.

(21) Appl. No.: 14/255,517

(22) Filed: Apr. 17, 2014

(65) Prior Publication Data

US 2014/0313226 A1 Oct. 23, 2014

Related U.S. Application Data

(60) Provisional application No. 61/814,473, filed on Apr. 22, 2013.

(51) Int. Cl.
*G06T 19/00* (2011.01)
*G09G 5/00* (2006.01)
(Continued)

(52) U.S. Cl.
CPC ............ *G09G 5/003* (2013.01); *F16M 11/08* (2013.01); *F16M 11/10* (2013.01); *F16M 11/18* (2013.01);
(Continued)

(58) Field of Classification Search
CPC ..... G06T 19/00; G06T 19/006; G06T 19/003; G09G 2340/0492; G02B 27/017;
(Continued)

(56) References Cited

U.S. PATENT DOCUMENTS

| 4,648,574 A | 3/1987 | Granlund |
| 5,671,900 A | 9/1997 | Cutler |

(Continued)

FOREIGN PATENT DOCUMENTS

JP 2006346002 12/2006

OTHER PUBLICATIONS

Kuchelmeister et al., Panoramic Navigator: Augmented Reality Information System. Exhibitions: ZKM Karlsruhe 1997, i3 Conference 1998, Expo 2000 Hannover, 2000. [Retrieved on: Aug. 19, 2014]. Retrieved from internet: URL: http://www.kuchelmeister.net/projects.html.

(Continued)

*Primary Examiner* — Chante Harrison
(74) *Attorney, Agent, or Firm* — Pepper Hamilton LLP

(57) ABSTRACT

An apparatus for viewing augmented reality images in a hands-free manner includes a tracker base in which various interchangeable trackers may be placed. The interchangeable trackers include an image specialized to an application framework running on a device with an image capture device in range of the image. An arm connects to and extends from the tracker base, and includes a clasp for holding the device. With the augmented reality application running, the device provides a display of the augmented reality images associated with the image on the interchangeable tracker in a hands-free manner. The tracker base spins, providing different viewpoints of the augmented reality images. The tracking element and the image capture device are held in a fixed spatial relationship with respect to one another, resulting in a stable image. The apparatus provides interactions in a multi-system environment by invoking commands between the device and an external multimedia component.

16 Claims, 13 Drawing Sheets

(51) Int. Cl.
*F16M 13/00* (2006.01)
*F16M 11/08* (2006.01)
*F16M 11/10* (2006.01)
*F16M 11/18* (2006.01)
*F16M 11/20* (2006.01)
*F16M 11/38* (2006.01)
*F16M 13/02* (2006.01)

(52) U.S. Cl.
CPC ......... *F16M 11/2021* (2013.01); *F16M 11/38* (2013.01); *F16M 13/00* (2013.01); *F16M 13/02* (2013.01); *G06T 19/006* (2013.01)

(58) Field of Classification Search
CPC .... G02B 27/0178; F16M 13/00; F16M 13/02; F16M 11/00; F16M 11/04; F16M 11/08; F16M 11/10
USPC ................ 345/349, 649, 659, 632–633, 7, 8
See application file for complete search history.

(56) References Cited

U.S. PATENT DOCUMENTS

| | | | |
|---|---|---|---|
| 5,791,843 A | 8/1998 | Dreier | |
| 6,202,552 B1 | 3/2001 | Billington | |
| 6,231,020 B1 | 5/2001 | Willson | |
| 6,330,356 B1 | 12/2001 | Sundareswaran et al. | |
| 6,394,402 B2 | 5/2002 | Coonan et al. | |
| 6,464,185 B1 | 10/2002 | Minelli et al. | |
| 7,092,001 B2 | 8/2006 | Schulz | |
| 7,525,566 B2 | 4/2009 | Horita | |
| 7,626,569 B2 | 12/2009 | Lanier | |
| 7,630,193 B2 | 12/2009 | Ledbetter et al. | |
| 7,640,866 B1 | 1/2010 | Schermerhorn | |
| 7,815,509 B2 | 10/2010 | Yamaya et al. | |
| 7,866,618 B2 | 1/2011 | Grabania et al. | |
| 8,077,963 B2 | 12/2011 | Wang et al. | |
| 8,226,062 B2 | 7/2012 | Yu-Yang et al. | |
| 8,355,813 B2 | 1/2013 | Mori et al. | |
| 8,717,294 B2 * | 5/2014 | Weising | G09G 5/08 345/158 |
| 2004/0080548 A1 | 4/2004 | Daily et al. | |
| 2005/0007445 A1 | 1/2005 | Foote et al. | |
| 2006/0118010 A1 | 6/2006 | Bartoszewicz | |
| 2006/0232609 A1 * | 10/2006 | Humphries | A61M 21/02 345/659 |
| 2008/0223802 A1 | 9/2008 | Wu | |
| 2010/0214284 A1 | 8/2010 | Rieffel et al. | |
| 2010/0302348 A1 | 12/2010 | Richards | |
| 2011/0147546 A1 | 6/2011 | Monsalve et al. | |
| 2011/0169861 A1 | 7/2011 | Suzuki et al. | |
| 2012/0026684 A1 | 2/2012 | Matthews | |
| 2012/0122570 A1 | 5/2012 | Baronoff | |
| 2012/0255466 A1 | 10/2012 | Jarnes | |
| 2013/0002718 A1 * | 1/2013 | Kato | G06F 1/1626 345/659 |
| 2014/0168264 A1 * | 6/2014 | Harrison | G02B 27/0176 345/633 |
| 2015/0356788 A1 * | 12/2015 | Abe | A63F 13/428 345/633 |
| 2016/0140930 A1 * | 5/2016 | Pusch | G06F 3/011 345/633 |

OTHER PUBLICATIONS

International Search Report dated Sep. 10, 2014 for PCT/US2014/034522.

* cited by examiner

APPARATUS FOR HANDS-FREE AUGMENTED REALITY VIEWING

CROSS-REFERENCE TO RELATED APPLICATIONS

This application claims priority to U.S. Provisional Patent Application No. 61/814,473, entitled "Apparatus for Hands-Free Augmented Reality Viewing" filed on Apr. 22, 2013, the contents of which are hereby incorporated by reference in its entirety.

TECHNOLOGY FIELD

The present disclosure relates generally to viewing augmented reality images, and more particularly to an apparatus that provides hands-free viewing of augmented reality images.

BACKGROUND

Augmented reality is rapidly becoming more prevalent in various areas, including day-to-day applications such as, for example, viewing augmented reality images relating to a user's current location. Current techniques for viewing augmented reality images may require precise movements or positioning by the user and are not, in some instances, hands-free. For example, to view an augmented reality image, a user may be required to hold his or her mobile device at a precise location in range of a target; once the user attains the precise location, to obtain a clear view of the image, the user must attempt to hold his or her device in a steady manner directed at the target.

Other options for viewing augmented reality images may be hands-free (e.g., glasses, goggles, and the like worn by a user) but do not readily allow for viewing by more than one user at a time and for easily viewing multiple perspectives from one location.

Thus, an apparatus that facilitates hands-free viewing of augmented reality images is desirable. It is further desired that the apparatus display the augmented reality images without requiring precise movement and handling from the user while allowing more than one user to view the images.

SUMMARY

Embodiments of the present invention relate to an apparatus that facilitates viewing of augmented reality images in a hands-free manner.

In an embodiment, an apparatus for viewing augmented reality images includes: a tracker base in which a receiver is situated, the receiver configured to hold an interchangeable tracker with a tracking element; a base for supporting the tracker base; a rotation device mounted between the tracker base and the base, the rotation device configured to cause the tracker base to rotate with respect to the base; an arm attached to and extending from the base; and a holder attached to an extending end of the arm, the holder configured to hold a device in range of the tracking element. An image capture device of the device focused on the tracking element and an augmented reality application running on the device are configured to provide for augmented reality images associated with the tracking element to be displayed on a display portion of the device. Different viewpoints of the augmented reality images are provided upon rotation of the tracker base.

In an embodiment, the tracking element and the image capture device are held in a fixed spatial relationship with respect to one another.

According to an embodiment, the interchangeable tracker fits securely within the receiver to rotate with the tracker base, and the interchangeable tracker is removable from the receiver to allow for another of a plurality of interchangeable trackers to be inserted in the receiver.

In an embodiment, the apparatus for viewing augmented reality images further includes one or more legs that extend from the base.

In an embodiment, the base is embedded in a stand-alone structure.

In an embodiment, the apparatus further includes a guard that surrounds side and bottom portions of the tracker base and is secured to the base.

According to an embodiment, the arm is comprised of one or more arm segments, the one or more arm segments movable to provide for the holder to hold the device in range of the tracking element.

According to an additional embodiment, the apparatus for viewing augmented reality images further comprises a plurality of arms attached to and extending from the base; and a plurality of holders attached to an extending end of a corresponding one of the plurality of arms, each of the plurality of holders configured to hold a corresponding device in range of the tracking element.

In an embodiment, the holder is adjustable to accommodate devices of varying sizes.

In an embodiment, the interchangeable tracker is configured to tilt with respect to the tracker base, thereby changing the angle and position between the tracking element and the device. In some embodiments, the rotation of the tracker base, positioning of the arm, and tilting of the interchangeable tracker are controlled (i) mechanically; (ii) through one or more motors connected to the tracker base, the arm, and the interchangeable tracker; (iii) through one or more pedals connected to the tracker base, the arm, and the interchangeable tracker; (iv) or a combination thereof.

According to an embodiment, the holder is attached to the arm at a position to provide a centered image on the display portion of the device.

In an additional embodiment, the tracking element is one of integral with or separable from the interchangeable tracker.

In an embodiment, the apparatus further includes a hinge component configured to fold the base in half; a tracker receiver formed on one half portion of the hinged base configured to hold the rotation device and the tracker base with the receiver for receiving the interchangeable tracker with the tracking element; an arm receiver on the other half portion of the hinged base configured to hold the arm and the holder; and an arm hinge component configured to move the arm and the holder from within the arm receiver to a position in which the device is in a maintained field of view of the tracking element.

In some embodiments, the apparatus further includes a plurality of receivers formed within a top portion of the tracker base, each receiver configured to hold a respective interchangeable tracker with a tracking element.

In some additional embodiments, the apparatus further includes a plurality of tracking elements attached to the tracker base, wherein the tracker base is configured to extend out of a portion of the base and rotate to provide for augmented reality images associated with the tracking elements to be displayed on the display portion of the device.

Other aspects relate to a method of providing augmented reality images to be displayed on a display portion of a device with an augmented reality application installed thereon. The method comprises: obtaining images to be associated with a tracking element, the tracking element on an interchangeable tracker contained on a tracker base, the tracker base configured to rotate; uploading the images to a database accessible by the augmented reality application that runs on the device; and running the augmented reality application, wherein the augmented reality application is configured to: (i) detect the tracking element in range of an image capture device on the device; (ii) access the database to obtain the image associated with the detected tracking element; and (iii) render the image to be displayed on the display of the device. Different viewpoints of the images are provided upon rotation of the tracker base, and the tracking element and the image capture device are held in a fixed spatial relationship with respect to one another.

In an embodiment, uploading comprises importing to the database one or more of a user's models, materials, and photographs over email on a device.

In an embodiment, the augmented reality application continues to run and render images with the tracking element in range of the image capture device.

In an additional embodiment, the rendered images are updated as the tracker base rotates.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION

Embodiments of the present invention relate to an apparatus used to view augmented reality images in a hands-free manner. The apparatus of the present invention advantageously allows for various trackers to be interchanged within a base; the trackers include an image specialized to an application framework running on a device that is in range of the image. With the augmented reality application running, the apparatus provides a display of the augmented reality images associated with the image on the tracker to a user in a hands-free manner. Moreover, the apparatus provides the display of the augmented reality images in a fixed spatial relationship between the device and the image on the tracker. The base spins, providing different viewpoints of the augmented reality images. Detailed aspects are provided below with reference to the various figures.

Figure 1:
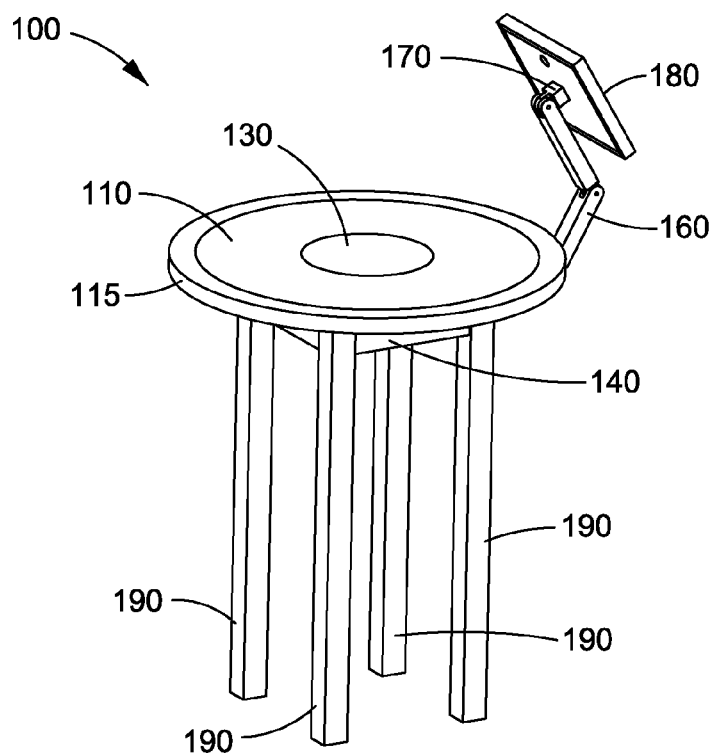
FIG. 1 shows a perspective view of an apparatus for hands-free viewing of augmented reality images, according to an embodiment.
Figure 2:
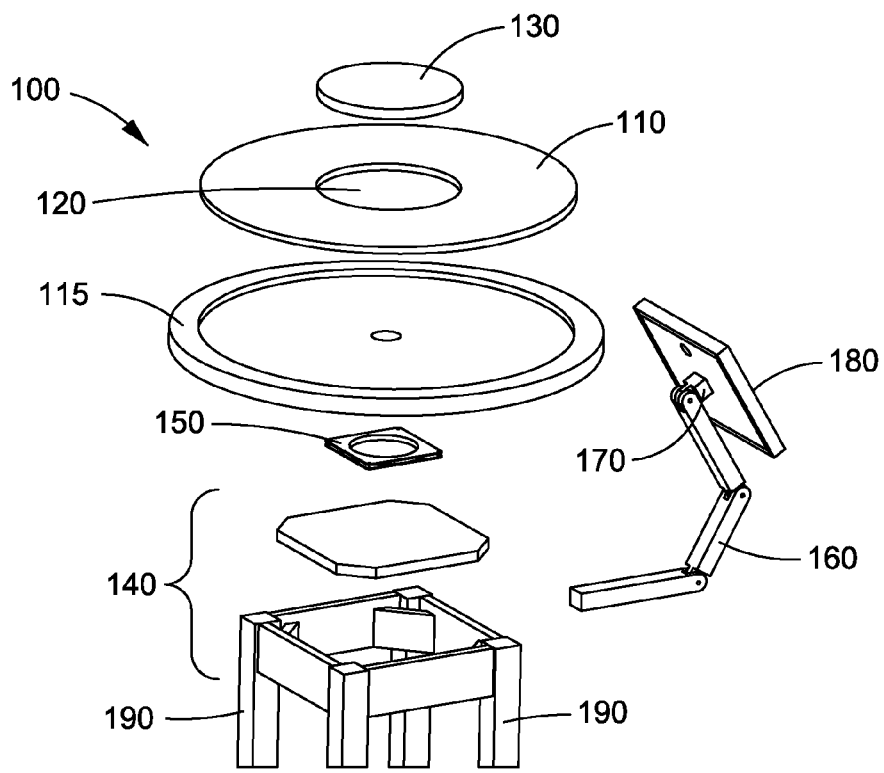
FIG. 2 shows an exploded perspective view of an apparatus for hands-free viewing of augmented reality images, according to an embodiment.
Figure 3:
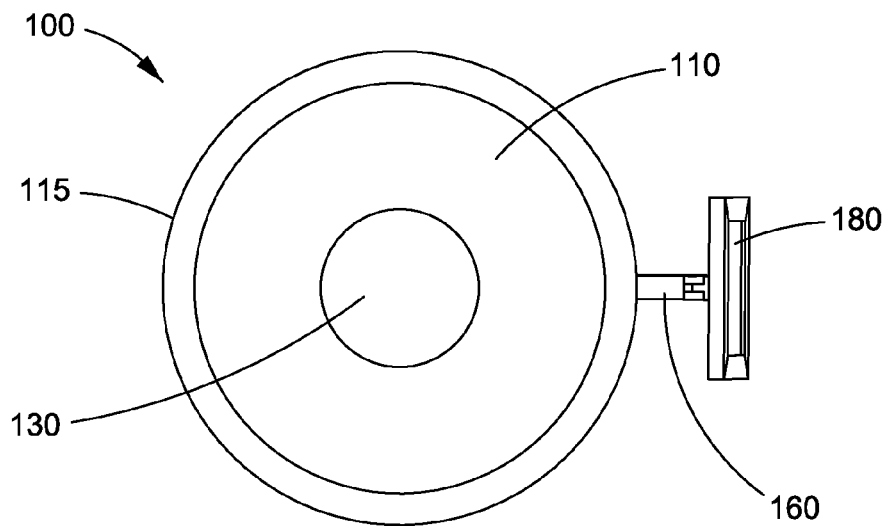
FIG. 3 shows a top view of an apparatus for hands-free viewing of augmented reality images, according to an embodiment.
Figure 4:
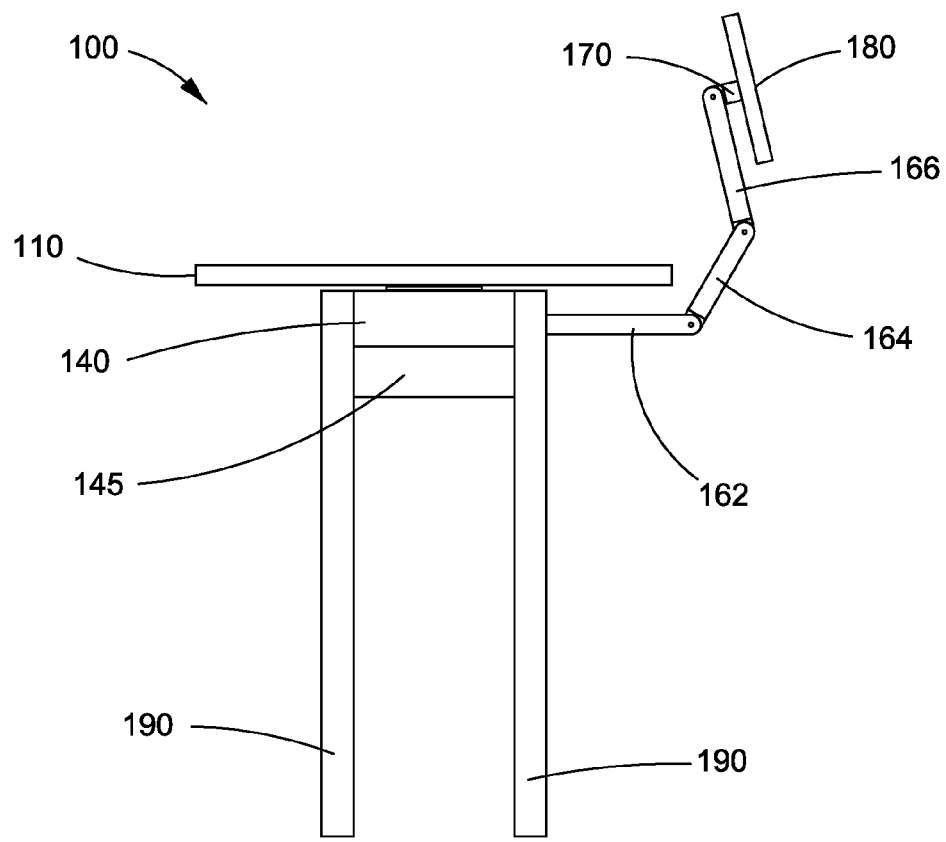
FIG. 4 provides a side view of an apparatus for hands-free viewing of augmented reality images, according to an embodiment.
Figure 5:
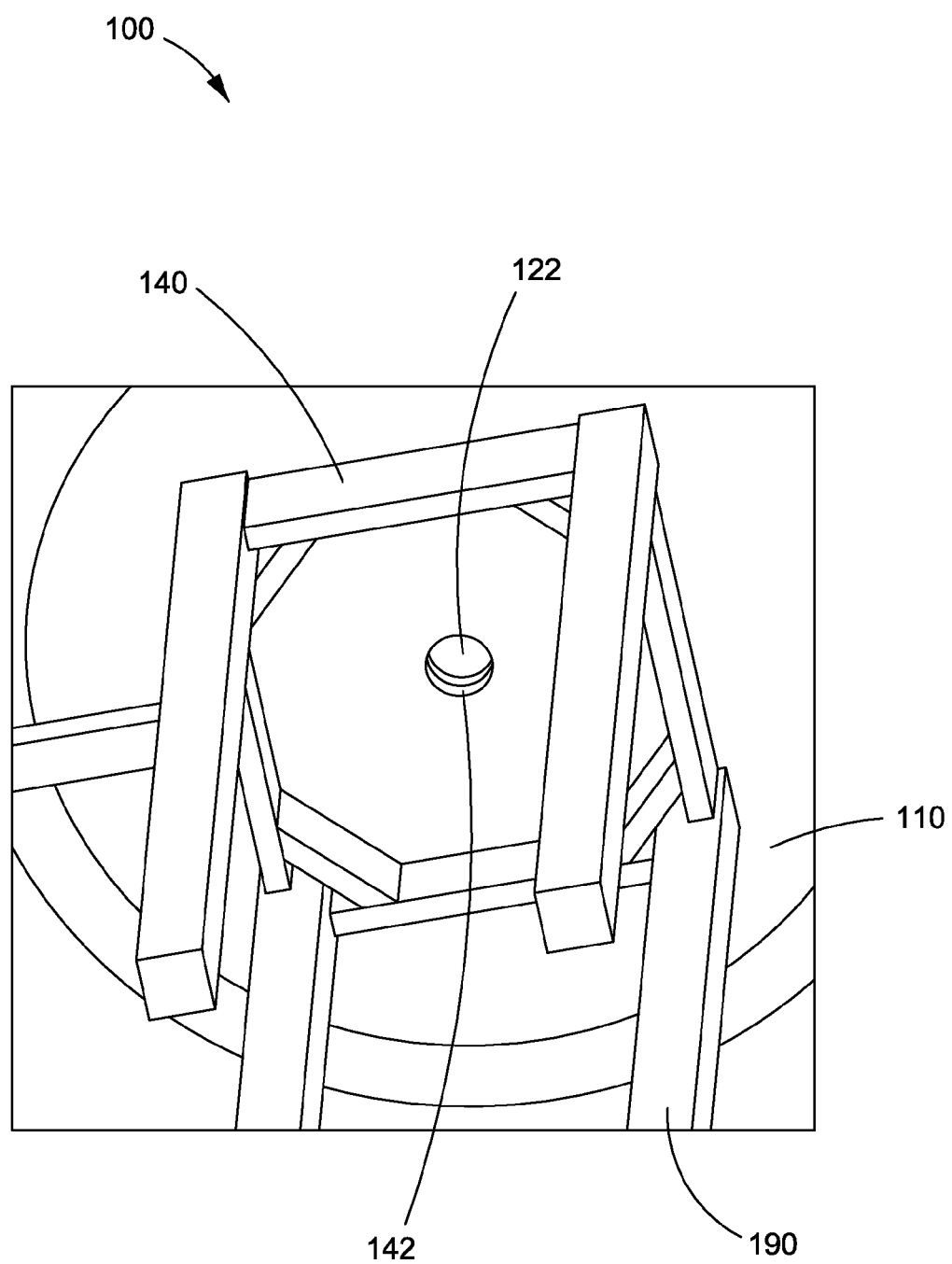
FIG. 5 provides a bottom view of an apparatus for hands-free viewing of augmented reality images, according to an embodiment.

An augmented reality viewing apparatus 100, according to an embodiment, is illustrated in FIGS. 1-5. FIG. 1 provides a perspective view of the apparatus 100; FIG. 2 illustrates an exploded perspective view; FIG. 3 provides a top view; FIG. 4 a side view; and FIG. 5 a bottom view.

The apparatus 100 includes a tracker base 110 in which a receiver 120 is situated. An interchangeable tracker 130 with a tracking element 135 (see, e.g., FIG. 12) fits within the receiver 120. The tracking element 135, in some embodiments, may be a fiducial or fiducial marker. In imaging technology, a fiducial or fiducial marker refers to an object used in the field of view of an imaging system, which appears in the image produced, for use as a point of reference or a measure.

In one embodiment, the receiver 120 is a cavity formed within a portion of the tracker base 110. In other embodiments, the receiver 120 may include a raised wall or rim into which the interchangeable tracker 130 fits. According to an embodiment, the interchangeable tracker 130 fits securely within the receiver 120, allowing the interchangeable tracker 130 to move with movement of the tracker base 110, as further described below. While fitting securely within the receiver 120, the interchangeable tracker 130 is also readily removable from the tracker base 110. In one embodiment, an opening or hole 122 is formed in a bottom portion of the receiver 120 to facilitate removal of the interchangeable tracker 130 (see bottom view in FIG. 5). Alternatively or additionally, a tab may be formed in a side portion of the receiver 120 for facilitating removal of the interchangeable tracker 130.

The receiver 120, as shown in FIGS. 1, 2, 3, and 5, is located in a centered or substantially centered position of the tracker base 110. However, the apparatus 100 is not so limited to this positioning, and the receiver 120 may be formed in other areas of the tracker base 110. Moreover, while the tracker base 110, the receiver 120, and the interchangeable tracker 130 are shown to be circular in shape, the apparatus 100 is not so limited to this configuration. For example, other shapes for the tracker base 110, the receiver 120, and the interchangeable tracker 130 may be used, and the tracker base 110 may be one particular shape (e.g., circular) while the receiver and the interchangeable tracker 130 are another (e.g., square). Additionally, while the tracker base 110, the receiver 120, and the interchangeable tracker 130 are shown to be generally planar, the apparatus 100 is not so limited to this configuration. For example, in one embodiment, the tracker base 110 may be in the form of a concave bowl with a support component for the receiver 120 located in and extended upward from a portion of the bowl.

The apparatus 100 further includes a base 140. The base 140 may be a generally flat board or the like. In some embodiments, the base 140 is comprised of a generally flat board connected to a plurality of support points for being supported on a table or the like (see FIG. 2). For example, optionally, one or more legs 190 extend from the base 140. The one or more legs 190 may be foldable and/or extendible to accommodate various heights. According to another embodiment, the base 140 is part of a larger component, such as a piece of furniture (e.g., a table), and the apparatus 100 is thus embedded in or part of the furniture. In one embodiment, the base 140 may comprise an opening or hole 142 generally corresponding to the opening or hole 122 formed in the bottom portion of the receiver 120 to facilitate removal of the interchangeable tracker 130.

A rotation device 150 is mounted between the tracker base 110 and the base 140. The rotation device 150, according to an embodiment, comprises a rotary system of ball bearings, such as a Lazy Susan or other hand-rotated flat or nearly-flat platform. A bottom portion of the rotation device 150 is secured (e.g., nailed, screwed, glued, or the like) to the base 140. The tracker base 110 is secured (e.g., nailed, screwed, glued, or the like) to a top portion of the rotation device 150. Thus, the tracker base 110 may be rotated by applying pressure to the tracker base 110 through, for example, user's hand movements (i.e., spinning the tracker base 110). The tracker base 110, and the interchangeable tracker 130 fitted within the receiver 120, are thus rotatable in 360° along a vertical axis with respect to the base 110.

Optionally, a guard 115 surrounds side and bottom portions of the tracker base 110. The guard 115 is mounted or secured to the base 140. In one embodiment, a bottom portion of the guard 115 may comprise an opening through which the rotation device 150 is secured to the base 140. In another embodiment, the rotation device 150 is secured to a bottom portion of the guard 115 (i.e., the rotation device 150 is placed and secured within the guard 115), with the tracker base 110 fitting within the guard 115 on top of the rotation device 150. In this manner, when the tracker base 110 is spinning, the side portions of the tracker base 110 are surrounded by the guard 115 as a safety feature. The user may spin the tracker base 110 from a top portion thereof without being exposed to the rotating side portions. In the embodiment in which the guard 115 comprises an opening in the bottom portion, the opening may correspond to the opening or hole 122 formed in the receiver 120 and to the opening or hole 142 formed in the base 140 to facilitate removal of the interchangeable tracker 130.

According to an embodiment, attached to and extending from the base 140 is an arm 160, at which one end is a holder 170 configured to adjust and hold a device 180. The arm 160 may be removably attached to the base 140; for example, the arm 160 may attach to and detach from the base 140 with an adjustable clamp or other mechanism (not shown). According to another embodiment, a plurality of arms are attached to and extend from the base 140, each arm configured to hold a respective device (see FIG. 10). According to an additional embodiment, the apparatus 100 does not have means for securing a device thereto, such as the arm 160 and holder 170; instead, one or more users wears (e.g., glasses) and/or holds his or her own respective devices.

The arm 160 may be comprised of a plurality of arm segments. For example, according to various embodiments, the arm 160 may be made of two, three, or more segments. In the embodiment illustrated in FIG. 4, the arm 160 is comprised of the following arm segments: a base arm 162, a positioning arm 164, and a holder arm 166. The base arm 162 is attached to the base 140 and extends outward thereof. The positioning arm 164 is attached at a first end to the extending end portion of the base arm 162 and at a second end to a first end of the holder arm 166. The other end of the holder arm 166 is attached to the holder 170. The connection between the arm segments (i.e., the base arm 162 and the positioning arm 164, and the positioning arm 164 and the holder arm 166) is such that the arm segments are moveable with respect to one another. For example, hinge components may be utilized at the attachment points, providing for movement of the positioning arm 164 and the holder arm 166.

According to an embodiment, a gyroscopic and/or pneumatic piston/hydraulic based arm system may be incorporated into the arm 160. Attached to one or more of the base arm 162, the positioning arm 164, and the holder arm 166, the gyroscopic and/or pneumatic technology produces a gravity-less like environment for arm movement while ensuring the arm 160 will stay upright and not fall in a downward direction. This allows a user to move the arm 160/holder 170/device 180 with precise and small movements with minimal resistance.

According to another embodiment, the arm 160 may be comprised of one arm segment made of a flexible material that is able to bend in multiple locations so that the holder 170 is desirably positioned, as further described below.

The holder 170 may be removably attached to the arm 160; for example, the holder 170 may attach to and detach from the arm 160 with a clamp or other mechanism (not shown). As noted above, the holder 170 is configured to adjust and hold the device 180. The holder 170 may include, according to an embodiment, a locking mechanism to lock the device 180 to the holder 170. According to an embodiment, the holder 170 is adjustable to accommodate devices of varying sizes.

The device 180 may be any type of computing device with an image capture device, processor, and display, such as, for example, a mobile device, a tablet PC, and the like. In some embodiments, the image capture device is a camera. With an augmented reality application running on the device 180 and with the camera focused on the tracking element 135, the device 180 provides a display of the augmented reality images associated with the tracking element 135 on the interchangeable tracker 130, allowing a user to view the augmented reality images in a hands-free manner. As the tracker base 110 spins, the user is provided with different viewpoints of the augmented reality images.

The apparatus 100 provides a maintained field of view and fixed spatial relationship between the device 180 (and hence the image capture device) and the tracking element 135 due to the arm 160 and the holder 170, and hence the device 180 held within the holder 170, being fixed with respect to the tracker base 110. The spatial relationship specifies how the objects are located in space in relation to one another. In one embodiment, the spatial relationship is three-dimensional; and in another embodiment, the relationship is two-dimensional. The fixed spatial relationship results in the augmented reality images being clearly presented to the user or users, without any wobble or movement that may otherwise occur with other viewing systems (e.g., a handheld device held or otherwise supported by a user). The rotational movement between the device 180 and the tracking element 135 provides the different viewpoints of the augmented reality images. As described above, the tracker base 110, and hence the interchangeable tracker 130 and tracking element 135, rotate while the arm 160, the holder 170, and the device 180 remain fixed. In other embodiments, the tracker base 110, the interchangeable tracker 130, and the tracking element 135 may be fixed while the arm 160, the holder 170, and the device 180 may rotate. In this embodiment, the arm 160 may be attached to a rotation device, similar or equivalent to the rotation device 150, while the tracker base 110 is fixed.

The relative position between the device 180 and the tracking element 135 may be adjusted in various ways. In one embodiment, the arm 160 may be moved in and out with respect to the tracking element. As described above, hinge components or the like may be utilized at the attachment points of the arm segments, providing for movement of the positioning arm 164 and the holder arm 166.

According to an embodiment, a drawer 145 may be provided as an optional feature of the apparatus 100 (see FIG. 4). The drawer 145 may be positioned in an area beneath the base 140 to provide storage, such as for various interchangeable trackers 130 and tracking elements 135. In an embodiment, a shelf may additionally or alternatively be provided.

Figure 6:
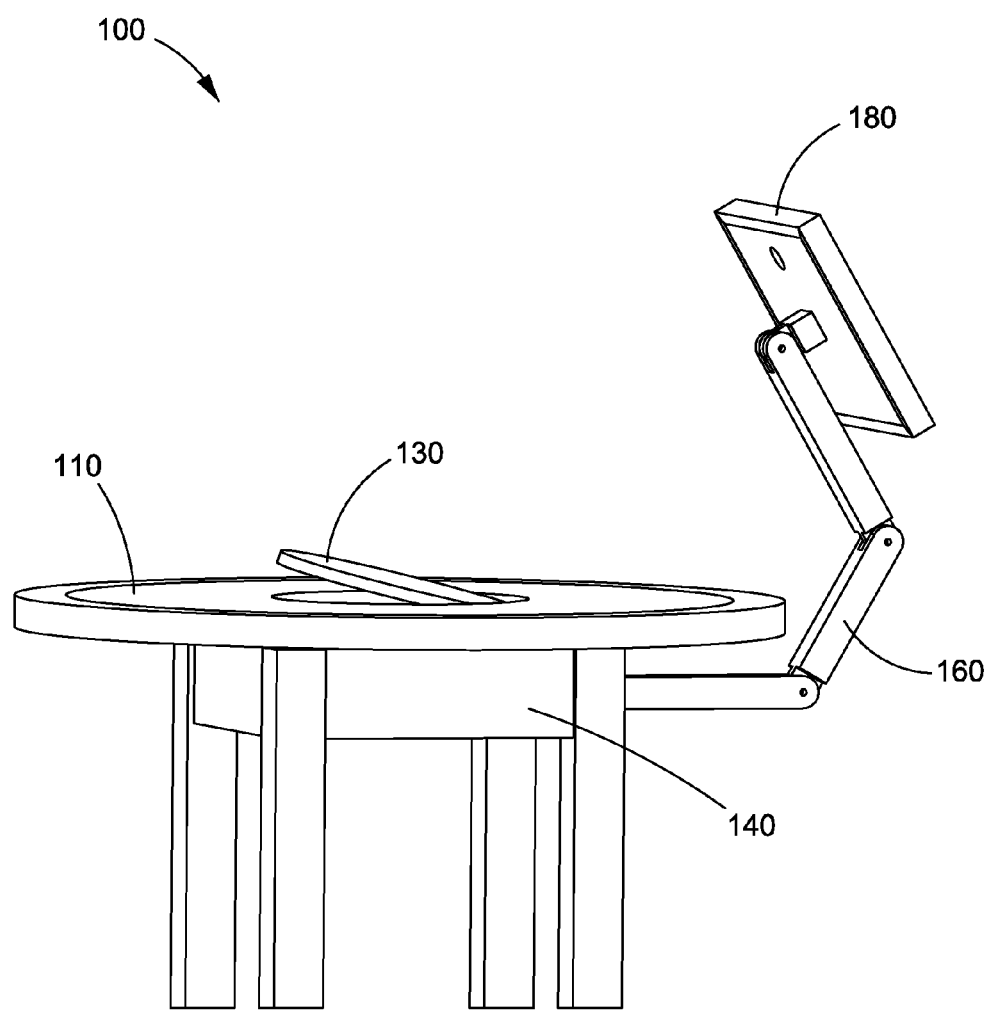
FIG. 6 provides a perspective view of an apparatus for hands-free viewing of augmented reality images, according to an additional embodiment.

In another embodiment, as illustrated in FIG. 6, the interchangeable tracker 130 may be tilted with respect to the tracker base 110 and the base 140, thereby changing the angle and position between the tracking element 135 and the device 180. This positioning affects the view of the augmented reality images provided on the display of the device 180. A hinge component may be provided in the receiver 120, and the interchangeable tracker 130 may attach to the hinge component (via, for example, a magnet, screw or the like) when placed in the receiver 120.

The various movements associated with the apparatus 100 may be achieved through a number of means. In one embodiment, the rotation of the tracker base 110, the positioning of the arm 160, and the tilting of the interchangeable tracker 130 may be achieved mechanically (i.e., the user rotating the tracker base 110, adjusting the arm 160, and/or tilting the interchangeable tracker 130). In another embodiment, one or more motors may be provided for one or more of the rotating, arm adjusting, and tilting. According to yet another embodiment, one or more pedals may be attached to the apparatus 100 to provide the rotating, arm adjusting, and/or tilting.

Figure 7A:
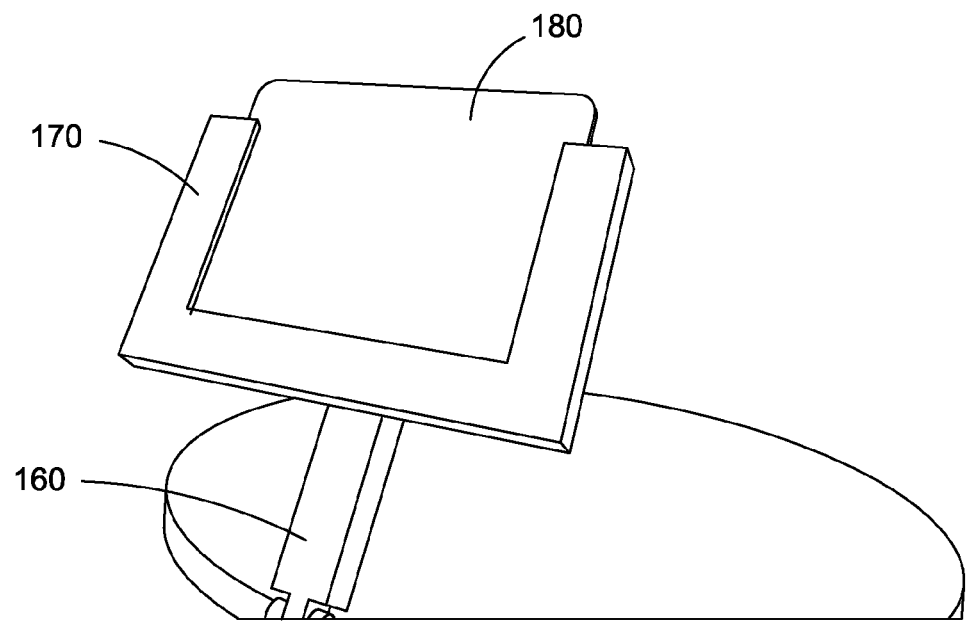
FIGS. 7A and 7B illustrate aspects of an apparatus for hands-free viewing of augmented reality images, according to embodiments.
Figure 7B:
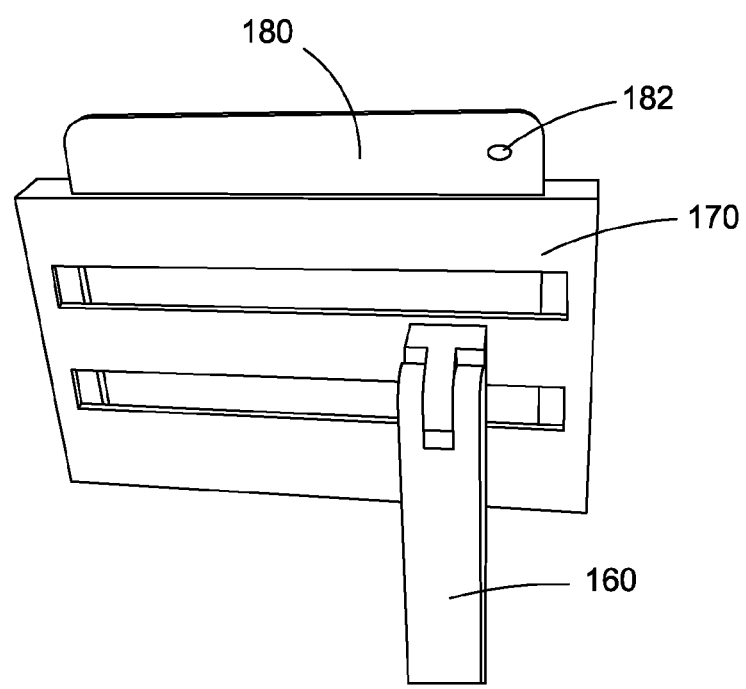

In some embodiments, the camera of the device 180 is centered on the tracking element to provide for a centered image being presented to the user on the display of the device 180. To achieve the centered image on the display, the location of the attachment point of the holder 170 to the arm 160 may be depend on the location of the camera on the particular device 180. For example, with reference to FIG. 7A, the arm 160 is attached to the holder 170 at or near a center point of the holder 170. In this example, the camera of the device 180 may be at or near a center point of the device. In another embodiment, as shown in FIG. 7B, the arm 160 is attached to the holder 170 in a position skewed from the center of the holder 170. In this example, a camera 182 of the device 180 is skewed from the center of the device 180. By having the arm 160 and the holder 170 connect at this point near the location of the camera 182, the user will be presented with a centered image on the display of the device 180.

As the interchangeable tracker 130 can be removed from the receiver 120, various other interchangeable trackers may be placed into the receiver 120 to display augmented reality scenes associated with the various tracking elements. According to an embodiment, the tracking element 135 is integral with the interchangeable tracker 130. For example, the tracking element 135 may be permanently or semi-permanently secured to the interchangeable tracker 130 or may be formed within (e.g., etched) the interchangeable tracker 130. In another embodiment, the tracking element 135 is separable from the interchangeable tracker 130, so that the interchangeable tracker 130 does not need to be removed from the receiver 120 to display another set of augmented reality images; instead, the tracking element 135 may be removed and replaced with another tracking element. In this embodiment, the tracking element 135 may sit on a top portion of the interchangeable tracker 130 and may be secured thereto with tape or the like, for example. In other embodiments, the tracking element 135 is integral with the tracker base 110, eliminating the receiver 120 and the interchangeable tracker 130.

The augmented reality viewing apparatus 100 and its various components may be made from a variety of materials, including but not limited to wood, plastic, metal, and recycled materials. The various components of the apparatus 100 need not be formed from the same type of material.

Figure 8A:
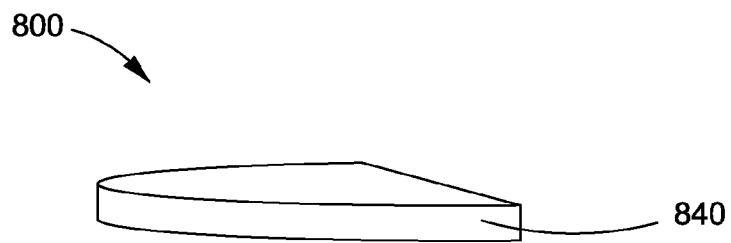
FIGS. 8A, 8B, and 8C show views of an apparatus for hands-free viewing of augmented reality images, according to another embodiment.
Figure 8B:
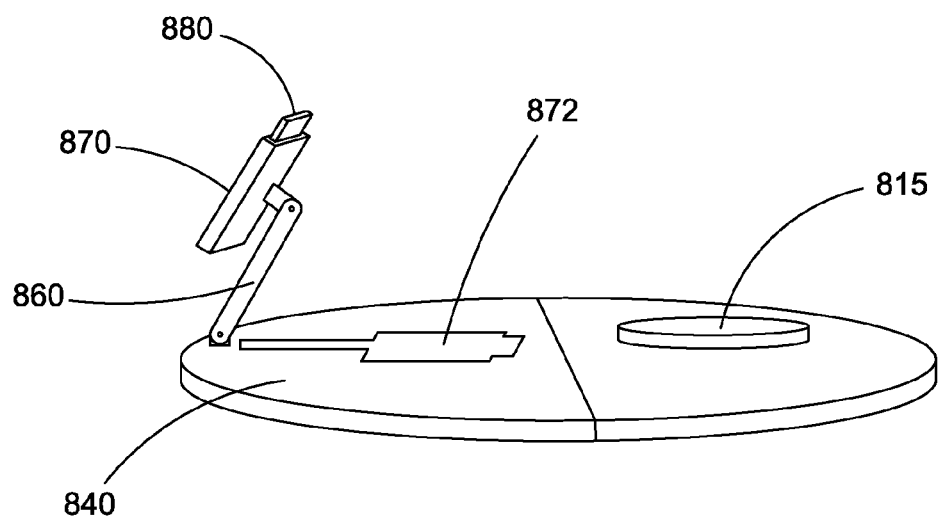
Figure 8C:
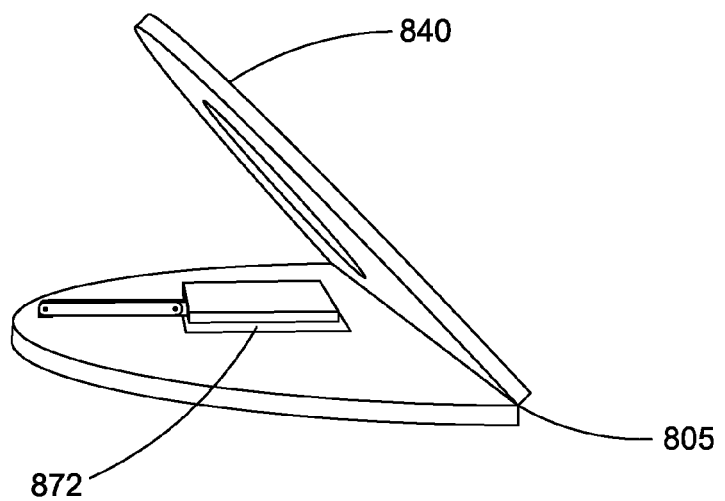

According to an additional embodiment, a travel apparatus 800 for viewing augmented reality images is provided, as illustrated in FIGS. 8A, 8B, and 8C. The travel apparatus 800 may be comprised of a light-weight material, such as plastic or aluminum, and folds for easy transport and storage. The travel apparatus 800 is comprised of a base 840 which folds in half with a hinge 805. The travel apparatus 800 includes a tracker receiver 815 on one side of the hinged base 840. On the other side of the hinged base, the travel apparatus includes an arm receiver 872.

In one embodiment, the tracker receiver 815 is configured to hold a rotation device and a tracker base with a receiver for receiving an interchangeable tracker with a tracking element formed or attached thereon, similar to the rotation device 150, the tracker base 110, the receiver 120, the interchangeable tracker 130, and the tracking element 135 described with respect to the apparatus 100. In another embodiment, the tracker receiver 815 is configured to hold the rotation device and the tracker base without a receiver formed therein. In this embodiment, various tracking elements are removably attached to the tracker base. In both embodiments, the rotation device allows for a user to rotate the tracker base.

The arm receiver 872 is configured to hold an arm 860 and a holder 870. In some embodiments, the arm receiver 872 has enough space for holding a device 880. The arm 860 and the holder 870 are attached to the base 840 with a hinge component or the like for moving the arm 860 and the holder 870 from within the arm receiver 872 to a position in which the device 880 is in a maintained field of view of the tracking element. The arm 860 may be comprised of various arm segments as described with respect to the arm 160. Similarly, the holder 870 may have equivalent features as the holder 170. The operation of the travel apparatus 800 is similar to that of the apparatus 100: with an augmented reality application running on the device 880 and with the camera focused on the tracking element, the device 880 provides a display of the augmented reality images associated with the tracking element, allowing one or more users to view the augmented reality images in a hands-free manner. As the tracker base spins, the user is provided with different viewpoints of the augmented reality images.

Figure 9:
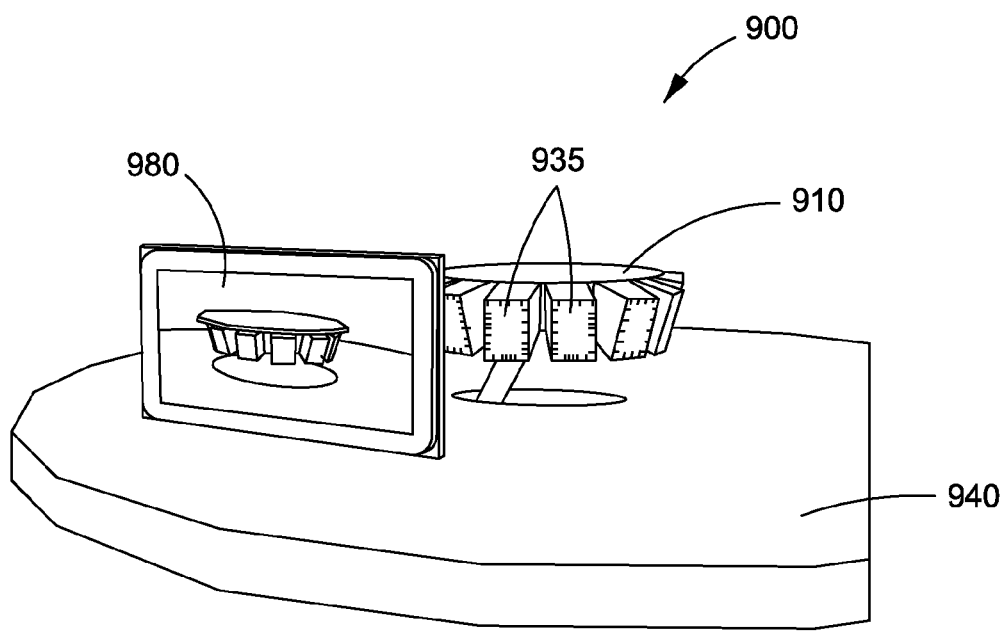
FIG. 9 shows a perspective view of an apparatus for hands-free viewing of augmented reality images, according to yet another embodiment.

According to additional embodiments, an apparatus for viewing augmented reality images may include a plurality of tracking elements. In one embodiment, a plurality of cavities are formed within a top portion of the tracker base. In another embodiment, as illustrated in FIG. 9, an apparatus 900 has a plurality of tracking elements 935 attached to a tracker base 910. The tracker base 910 extends out of a portion of a base 940 and rotates so that one or more users may view augmented reality images associated with the respective tracking elements 935 in the field of view of a device 980. Depending on the augmented reality application running on the device 980, the augmented reality image displayed on the device 980 may be one image associated with each tracking element 935, or if multiple tracking elements 935 are in the field of view of the device 980, the augmented reality image displayed may be a function of the multiple tracking elements 935 as defined by the particular application. The rotation may be achieved through a rotation device, such as the Lazy Susan described with respect to apparatus 100, or the like.

Figure 10:
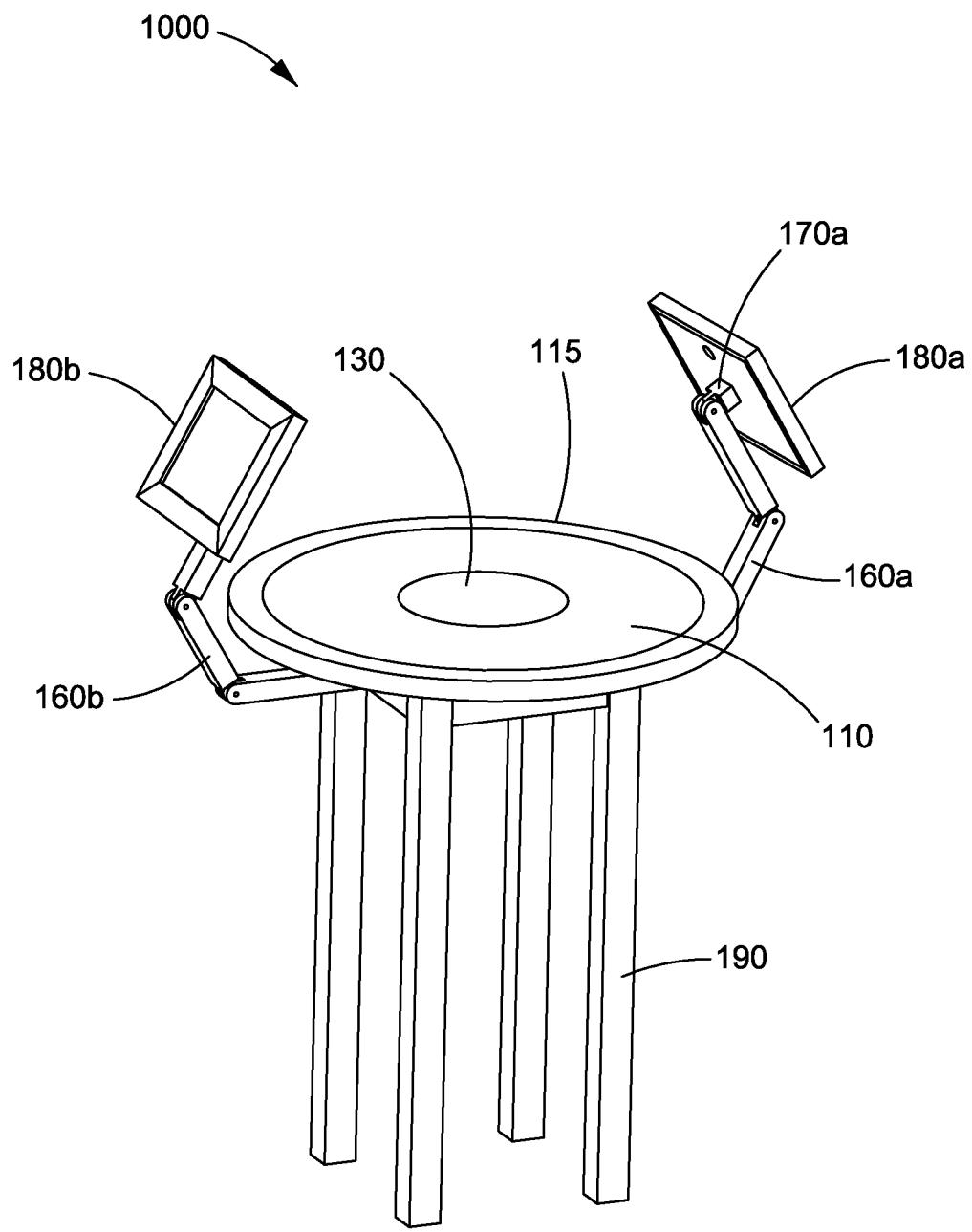
FIG. 10 illustrates a perspective view of an apparatus for hands-free viewing of augmented reality images, according to another embodiment.

FIG. 10 illustrates a perspective view of an apparatus 1000 for hands-free viewing of augmented reality images, according to an embodiment in which a plurality of arms 160 are attached to and extend from the base 140, each arm 160 configured to hold a respective device 180 in a respective holder 170. Shown are two arms, 160a and 160b, two holders, 170a and 170b, and two devices, 180a and 180b, though additional arms 160n, holders 170n, and devices 180n may be incorporated. This embodiment allows for multiple users to view augmented reality images in a hands-free manner. As the tracker base 110 spins, each user is provided with different viewpoints of the augmented reality images, relative to their respective device 180. Aside from the additional arms 160, holders 170, and devices 180, the apparatus 1000 may include the same components and operate in a similar manner as the apparatus 100, or variations thereof as described herein.

Figure 11A:
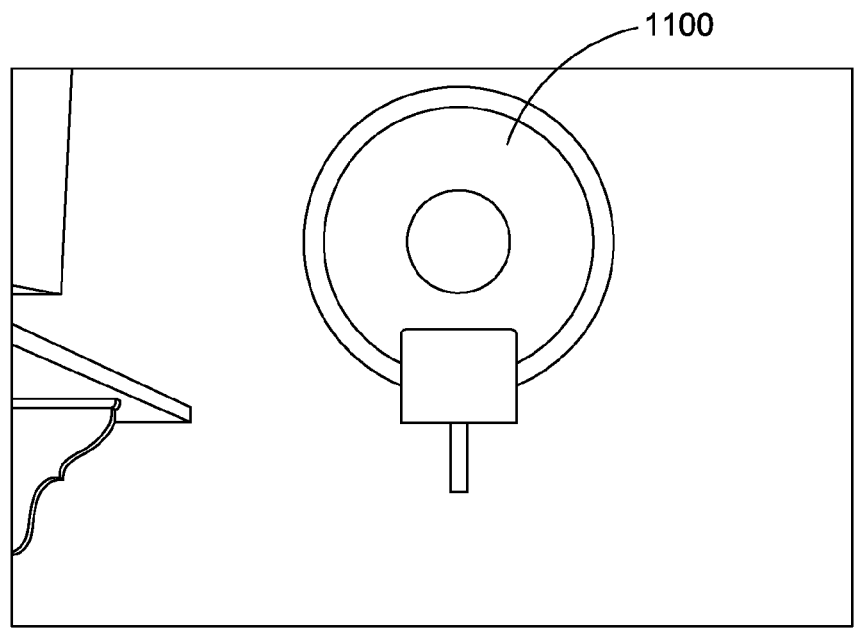
FIGS. 11A and 11B provide views of an apparatus for hands-free viewing of augmented reality images, according to yet an additional embodiment.
Figure 11B:
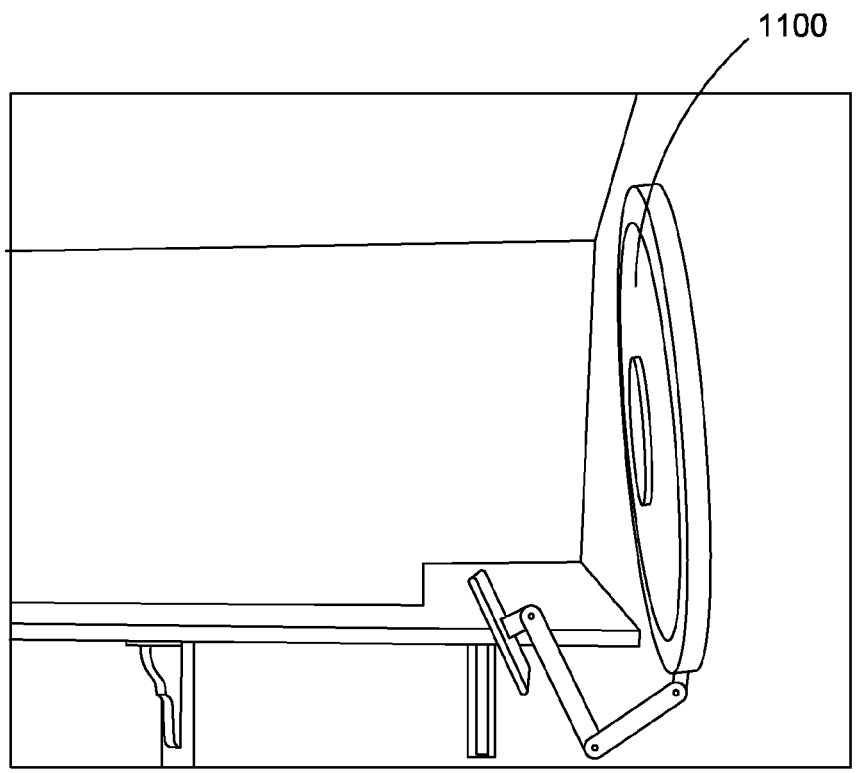

According to yet another embodiment, an apparatus 1100 may be mounted on a wall or other vertical or nearly vertically-oriented surface, as shown in FIGS. 11A and 11B. The apparatus 1100 may include all of the components as the apparatus 100, as well as the variations thereof described with respect to the apparatus 100.

Figures 12A, 12B, 12C:
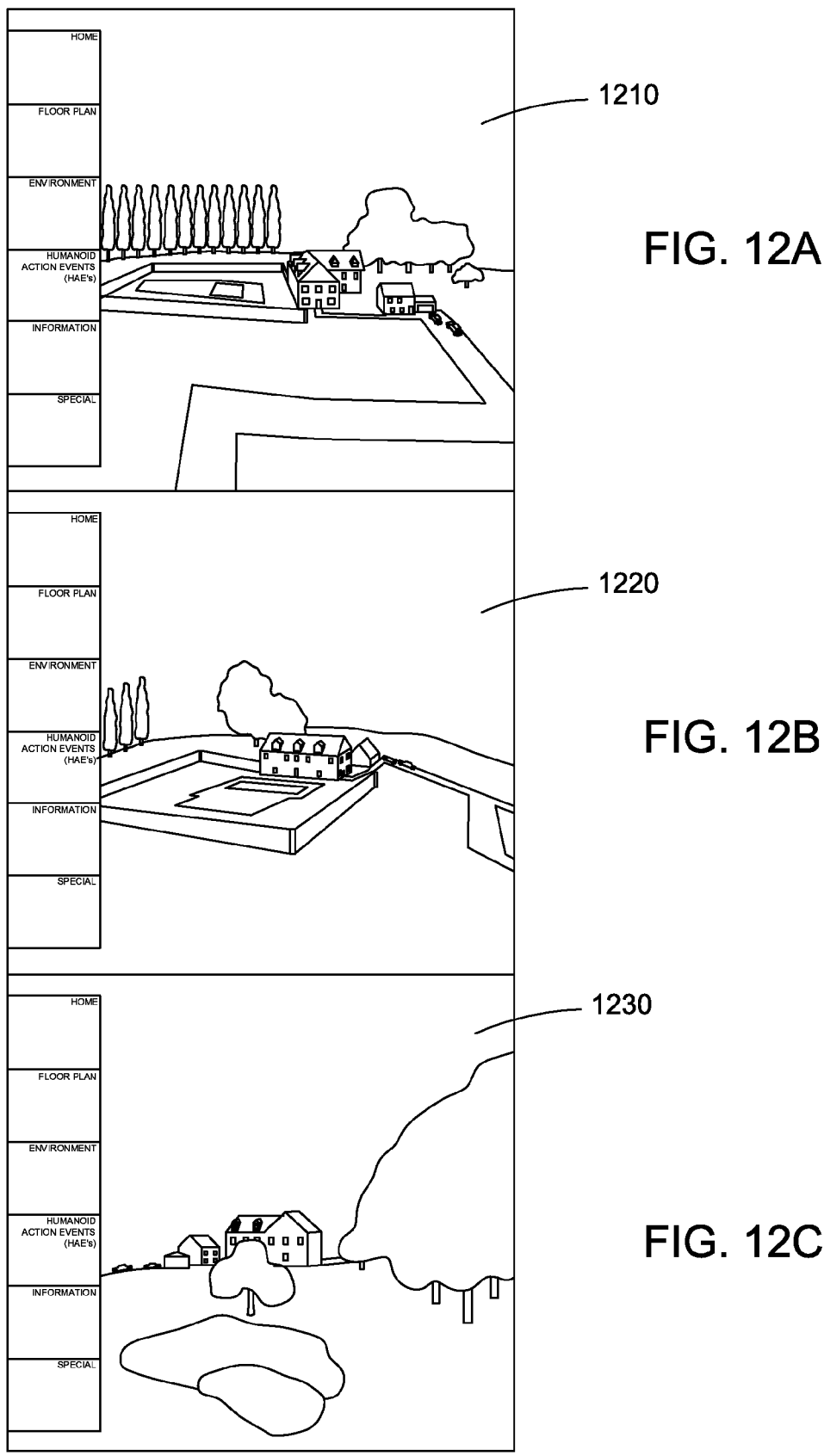
FIGS. 12A, 12B, and 12C illustrate a series of augmented reality images provided with an apparatus for hands-free viewing of augmented reality images, according to an embodiment.

FIGS. 12A, 12B, and 12C are a series of augmented reality images 1210, 1220, and 1230, respectively, provided with an apparatus for hands-free viewing of augmented reality images, such as the apparatus 100, 800, 900, 1000, or 1100. With reference to the apparatus 100, these images are the provided as a result of the camera of the device 180 being focused on the tracking element 135. An augmented reality application is running on the device 180, and the device 180 thus provides a display of the augmented reality images associated with the tracking element 135 on the interchangeable tracker 130. Augmented reality images 1210, 1220, and 1230 are images at different viewpoints and are shown as the tracker base 110 is rotated.

As shown in FIGS. 12A, 12B, and 12C, each image has a plurality of layers associated with it, as represented by the tabs on the left-side of each image. A user may select a particular tab to be presented with another image, information related to the image, or the like.

Figure 13:
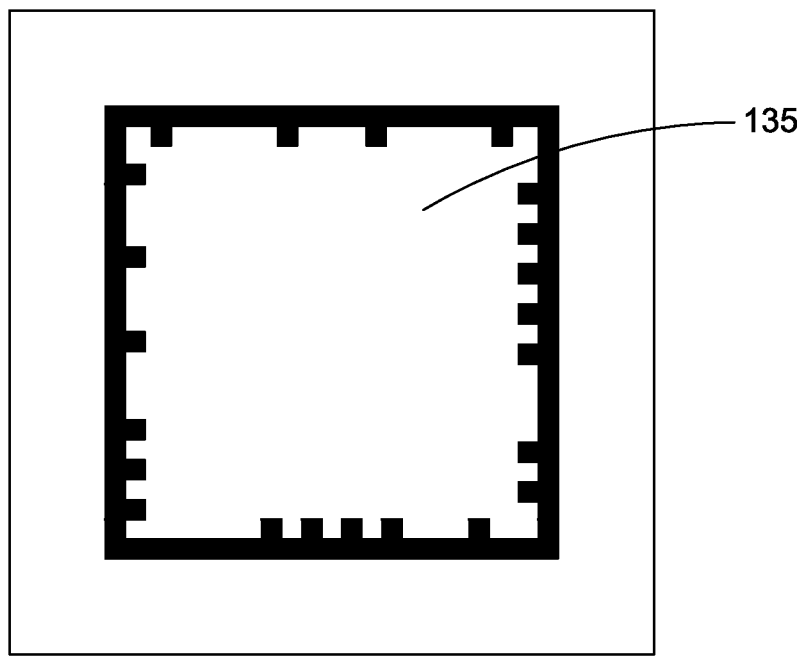
FIG. 13 is an exemplary aspect of an apparatus for hands-free viewing of augmented reality images, according to embodiments.

FIG. 13 is an example of a tracking element 135. The apparatuses 100, 800, 900, 1000, and 1100, and variations thereof described herein, are not limited to this particular type of tracking element. Other tracking element types may be used in accordance with the augmented reality application running on the respective device used with the apparatus 100, 800, 900, 1000, or 1100, or variations thereof as described herein.

Figure 14:
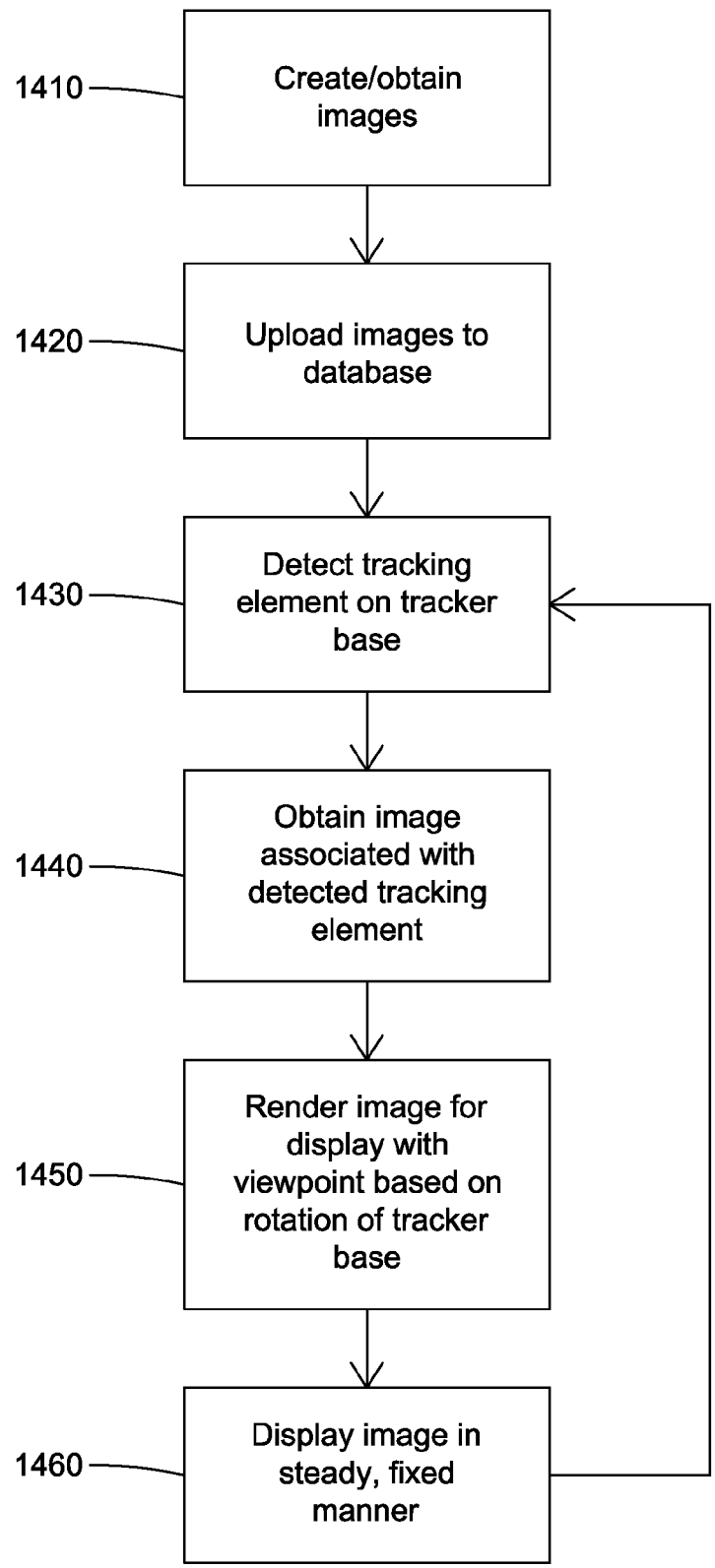
FIG. 14 is a flowchart illustrating a process of providing augmented reality images to a user with an augmented reality viewing apparatus, according to various embodiments.

FIG. 14 illustrates a flowchart 1400, representing the process of providing the augmented reality images to the user via his or her device with the apparatus 100, 800, 1000, 1100, or variations thereof as described above. A developer, who wishes to have images displayed on a device, such as the device 180, may use any number of available software development kits (SDKs) (e.g., Vision SDK) to create an augmented reality application to run on a plurality of various devices, such as the device 180. There is not a limit or constraint on the applications and devices that may be used with the apparatus 100, 800, 900, 1000, and 1100.

With reference to FIG. 14, at 1410, the developer creates or obtains images to be associated with a particular tracking element 135. The images may be a user's models, materials, photographs, and/or the like, for example.

At 1420, the images are uploaded to a database accessible by the augmented reality application that runs on the device 180. In the database, the images are associated with the particular tracking element 135. The upload may include an import of a user's models, materials, and/or photographs over email on a device, such as a tablet or mobile device, using an application downloaded from application distribution services.

At a later time, at 1430, with the augmented reality application running, the augmented reality application detects a tracking element 135 on the tracker base 110, where the tracking element 135 is in range of the camera on the device 180. At 1440, the augmented reality application accesses the database and obtains the image associated with the detected tracking element 135. In particular, as multiple images are associated with a particular tracking element 135, the image obtained is also a function of the orientation of the tracking element 135. For example, with reference to FIGS. 12A, 12B, and 12C, one of images 1210, 1220, or 1230 is displayed to the user based on the orientation of the tracking element 135 with respect to the camera of the device 180.

At 1450, the augmented reality application renders the image to be displayed on the display of the device 180, where the rendering is based on the rotation of the tracker base 110. Different viewpoints of the images are provided upon rotation of the tracker base 110. At 1460, the image is displayed in a fixed manner as the tracking element 135 and the image capture device are held in a fixed spatial relationship with respect to one another.

The steps of detecting a tracking element 135 (1430), obtaining the image associated with the detected tracking element 135 (1440), rendering the image (1450), and displaying the image on the display of the device 180 (1460) are repeated while the augmented reality application is running and the camera is in focus of the tracking element 135. The images are updated (1450) when the tracker base 110 is rotated. Meanwhile, the user is able to view a steady, stable image due to the fixed spatial relationship provided by the arrangement of the apparatus 100 (i.e., the arm 160 and the holder 170 with respect to the tracker base 110 and the tracking element 135).

Figure 15:
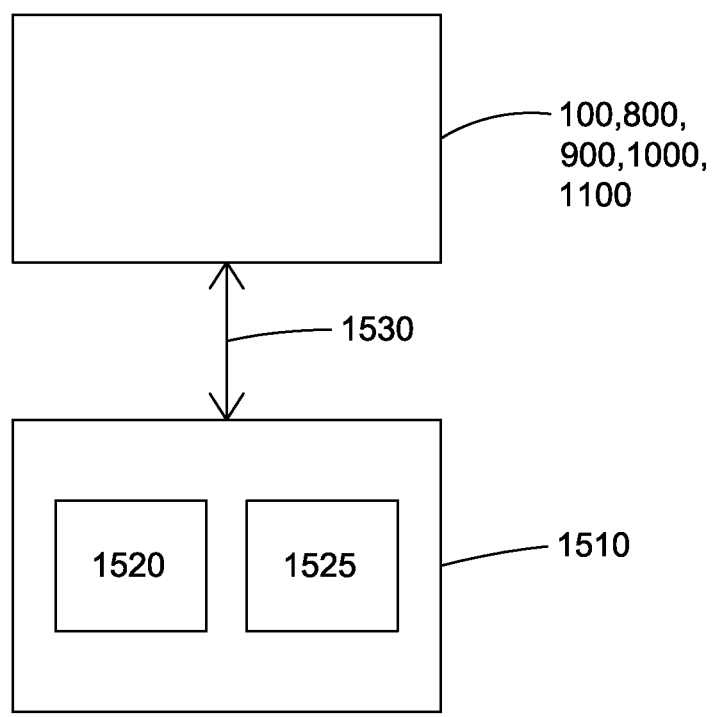
FIG. 15 is a diagram illustrating incorporating an augmented reality viewing apparatus in a multimedia system, according to an embodiment.

FIG. 15 is a diagram illustrating an incorporation of an augmented reality viewing apparatus 100, 800, 900, 1000, or 1100 in a multimedia system 1500, according to an embodiment, to provide additional interactions in a multi-system environment. The multimedia system 1500 includes an apparatus 100, 800, 900, 1000, or 1100, or variations thereof as described herein, connected to one or more external multimedia components 1510, including a display 1520 (such as a television) and a multimedia element 1525 (such as a video). A connection 1530 between the apparatus 100, 800, 1000, or 1100 and the external multimedia component 1510 may be a wired or wireless connection, such as through Wi-Fi or Bluetooth or the like.

User interactions associated with the apparatus 100, 800, 900, 1000, or 1100 change or affect the external multimedia component 1510. User interactions may include, but are not limited to, rotating the tracker base 110, tilting the interchangeable tracker 130 (see, e.g., FIG. 6), and inserting a new interchangeable tracker 130. Such interactions are configured to invoke commands to the external multimedia component 1510, through communication between the device 180 and the external multimedia component 1510 over the connection 1530. The invoked commands may include, but are not limited to, playing a video, manipulating video presentation (e.g., pausing, forwarding, etc.), playing a voice recording, and manipulating a voice recording. In one example, an interchangeable tracker 130 may correspond to a map, and rotation of the tracker base 110 results in various views of the map (and associated buildings and characters, etc.) being presented on the device 180. Incorporated in a multimedia system 1500, insertion of the interchangeable tracker 130 results in a related video being played on the external multimedia component 1510. In this manner, the multimedia system 1500 provides a user with multiple interactions: those displayed on the device 180 and those provided through the external multimedia component 1510.

The augmented reality viewing apparatuses provided herein have various uses. As described above, the apparatus may be made in various forms: (1) a portable to-go version; (2) a lightweight tabletop version; and (3) a furniture model in which the apparatus is embedded in or part of a piece of furniture.

Example uses of the augmented reality viewing apparatus include, but are in no way limited to: real estate, in which the apparatus may be placed in a house allowing users to see the house renovated or with different furnishings, landscaping, etc.; architecture, in which students or professionals can use the apparatus to show features of their projects; education, in which educators can display education-related topics to students in a classroom setting; parks and historical sights, where the apparatus can be used to provide images of events or battles or related information; party planning, where party planners can advertise their services and display mock augmented reality rehearsal and party images; and car dealerships to display aspects of various cars. The apparatus may be used in any type of location or situation in which it is desirable to provide augmented reality images. Moreover, with the multimedia system 1500, the example uses may be expanded to provide multiple interactions for the user.

Although the present invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

We claim:

1. An apparatus for viewing augmented reality images, the apparatus comprising:
   a tracker base in which a receiver is formed, the receiver configured to hold an interchangeable tracker with a tracking element;
   a base for supporting the tracker base;
   a rotation device mounted between the tracker base and the base, the rotation device configured to cause the tracker base to rotate with respect to the base;
   an arm attached to and extending from the base; and
   a holder attached to an extending end of the arm, the holder configured to hold a device in range of the tracking element;
   wherein an image capture device of the device focused on the tracking element and an augmented reality application running on the device are configured to provide for augmented reality images associated with the tracking element to be displayed on a display portion of the device; and wherein different viewpoints of the augmented reality images are provided upon rotation of the tracker base; and
   wherein the interchangeable tracker is configured to tilt with respect to the tracker base, thereby changing the angle and position between the tracking element and the device.

2. The apparatus of claim 1, wherein the tracking element and the image capture device are held in a fixed spatial relationship with respect to one another.

3. The apparatus of claim 1, wherein the interchangeable tracker fits securely within the receiver to rotate with the tracker base, wherein the interchangeable tracker is further removable from the receiver to allow for another of a plurality of interchangeable trackers to be inserted in the receiver.

4. The apparatus of claim 1, further comprising:
   one or more legs extending from the base.

5. The apparatus of claim 1, wherein the base is embedded in a stand-alone structure.

6. The apparatus of claim 1, further comprising:
   a guard surrounding side and bottom portions of the tracker base and secured to the base.

7. The apparatus of claim 1, wherein the arm is comprised of one or more arm segments, the one or more arm segments movable to provide for the holder to hold the device in range of the tracking element.

8. The apparatus of claim 1, further comprising:
   a plurality of arms attached to and extending from the base; and
   a plurality of holders attached to an extending end of a corresponding one of the plurality of arms, each of the plurality of holders configured to hold a corresponding device in range of the tracking element.

9. The apparatus of claim 1, wherein the holder is adjustable to accommodate devices of varying sizes.

10. The apparatus of claim 1, wherein the rotation of the tracker base, positioning of the arm, and tilting of the interchangeable tracker are controlled (i) mechanically; (ii) through one or more motors connected to the tracker base, the arm, and the interchangeable tracker; (iii) through one or more pedals connected to the tracker base, the arm, and the interchangeable tracker; (iv) or a combination thereof.

11. The apparatus of claim 1, wherein the holder is attached to the arm at a position to provide a centered image on the display portion of the device.

12. The apparatus of claim 1, wherein the tracking element is one of integral with or separable from the interchangeable tracker.

13. The apparatus of claim 1, further comprising:
a hinge component configured to fold the base in half;
a tracker receiver formed on one half portion of the hinged base configured to hold the rotation device and the tracker base for receiving the interchangeable tracker with the tracking element;
an arm receiver on the other half portion of the hinged base configured to hold the arm and the holder; and
an arm hinge component configured to move the arm and the holder from within the arm receiver to a position in which the device is in a maintained field of view of the tracking element.

14. The apparatus of claim 1, further comprising:
a plurality of receivers formed within a top portion of the tracker base, each receiver configured to hold a respective interchangeable tracker with a tracking element.

15. The apparatus of claim 1, further comprising:
a plurality of tracking elements attached to the tracker base, wherein the tracker base is configured to extend out of a portion of the base and rotate to provide for augmented reality images associated with the tracking elements to be displayed on the display portion of the device.

16. An apparatus for viewing augmented reality images, the apparatus comprising:
a tracker base in which a receiver is formed, the receiver configured to hold an interchangeable tracker with a tracking element;
a base for supporting the tracker base;
a hinge component configured to fold the base in half;
a rotation device mounted between the tracker base and the base, the rotation device configured to cause the tracker base to rotate with respect to the base;
a tracker receiver formed on one half portion of the hinged base configured to hold the rotation device and the tracker base for receiving the interchangeable tracker with the tracking element;
an arm attached to and extending from the base;
a holder attached to an extending end of the arm, the holder configured to hold a device in range of the tracking element;
an arm receiver on the other half portion of the hinged base configured to hold the arm and the holder; and
an arm hinge component configured to move the arm and the holder from within the arm receiver to a position in which the device is in a maintained field of view of the tracking element;
wherein an image capture device of the device focused on the tracking element and an augmented reality application running on the device are configured to provide for augmented reality images associated with the tracking element to be displayed on a display portion of the device; and wherein different viewpoints of the augmented reality images are provided upon rotation of the tracker base.

* * * * *